United States Patent [19]

Hamparian

[11] Patent Number: 4,509,473
[45] Date of Patent: Apr. 9, 1985

[54] SPRING DAMPER WITH CONTROLLED WEAR AREA

[75] Inventor: Nshan Hamparian, Brighton, Mich.

[73] Assignee: General Motors Corporation, Detroit, Mich.

[21] Appl. No.: 601,427

[22] Filed: Apr. 18, 1984

[51] Int. Cl.³ ............................................. F01L 3/10
[52] U.S. Cl. ......................... 123/188 SC; 123/188 P; 267/168; 251/337
[58] Field of Search ............... 123/90.65, 90.66, 90.67, 123/188 P, 188 SA, 188 SC; 267/168, 179, 180; 251/336, 337

[56] References Cited

U.S. PATENT DOCUMENTS

| | | | |
|---|---|---|---|
| 1,602,304 | 10/1926 | Heldt | 123/188 P |
| 3,336,913 | 8/1967 | McCormick | 123/188 P |
| 3,480,286 | 11/1969 | Kosatka | 123/188 P |
| 4,317,436 | 3/1982 | Barnhart et al. | 123/188 P |

FOREIGN PATENT DOCUMENTS 866665  4/1961  United Kingdom ............ 123/188 P

Primary Examiner—Ira S. Lazarus
Assistant Examiner—R. S. Bailey
Attorney, Agent, or Firm—Arthur N. Krein

[57] ABSTRACT

An internal type, spring damper for use in an internal combustion engine or the like having a cylinder head with a poppet valve supported for movement between valve open and valve closed positions and with a coiled valve return spring loosely encircling the stem of the valve and operatively associated at one end with the valve and having its bottom end operatively in abutment with the cylinder head whereby to normally bias the poppet valve to the closed position, has at least its corresponding bottom end of reduced external diameter for a predetermined axial extent whereby to eliminate damper-to-spring contact for up to at least 1½ coils of the valve spring at its bottom end.

3 Claims, 3 Drawing Figures

SPRING DAMPER WITH CONTROLLED WEAR AREA

FIELD OF THE INVENTION

This invention relates to a valve mechanism for use in an internal combustion engine and the like and, in particular, to a damper spring used to reduce or eliminate the surge of an associated valve return spring used to normally bias a poppet valve to its closed position.

DESCRIPTION OF THE PRIOR ART

The valve operating mechanism, as normally used in internal combustion engines and the like, includes a coil spring located concentric with an associate valve, such as a poppet valve, to resiliently oppose opening of the valve by a valve rocker or other actuator. Accordingly, the coil spring is operatively located so as to normally bias the poppet valve to its valve closed position, thus the term "valve return spring", is used to describe this spring.

It is also known in the art that such valve return springs, as used to effect valve closing are normally in the form of round wire compression springs that have spring resonance points which often occur within operating frequencies of the engine.

A well known method of reducing such spring coil resonance and therefore the stresses in the wire coils is to install an internal, usually flat wire, spring damper in close fit to the inside diameter of the round wire coil valve return spring as shown, for example, in U.S. Pat. No. 3,336,913, entitled Valve Stem Seal, issued Aug. 22, 1967 to Harold E. McCormick. The close fit of the spring damper within the valve return spring restrains the motion of the coils of the valve return spring through friction and thus eliminates high stresses and the possibility of valve bounce.

Applicant has now discovered that one negative aspect in the use of such an internal damper spring is the polishing and wear which occurs on the inside diameter surfaces of the round wire coils of the valve return spring that contact the outer diameter surfaces of the damper spring and, that when such wear occurs in a high stress area of the valve return spring, eventual removal of any compressive prestressing of the coils, as by shot peening, and the generation of stress risers can cause premature failure of the valve return spring.

SUMMARY OF THE INVENTION

The present invention relates to an improved valve spring damper for use with the valve return spring of a valve, the spring damper being configured so as to prevent the possibility of damper to valve return spring contact in the high stress area of the valve return spring which normally occurs about 1½ coils from the bottom end of the valve return spring, that is the end of such located next adjacent to the head of the associate poppet valve and which abuts, for example, against the cylinder head of the engine or the like.

Accordingly, a primary object of the present invention is to provide an improved spring vibration damper for use with the valve return spring of a poppet valve, the spring damper, of flat wire, having the coils at least at the bottom thereof of an external diameter so as to remain out of contact with at least 1½ coils at the end of the valve return spring next adjacent to the head of the associate poppet valve.

Another object of the invention is to provide an improved flat wire, valve spring damper having at least one end thereof of reduced outside diameter so that the damper does not contact the coils of an associate valve return spring until approximately 2½ coils from the end of the valve return spring next adjacent to the head of the associate poppet valve, that is, at the bottom of the valve return spring.

For a better understanding of the invention, as well as other objects and further features thereof, reference is had to the following detailed description of the invention to be read in connection with the accompanying drawings.

DESCRIPTION OF THE PREFERRED EMBODIMENT

Figure 1:
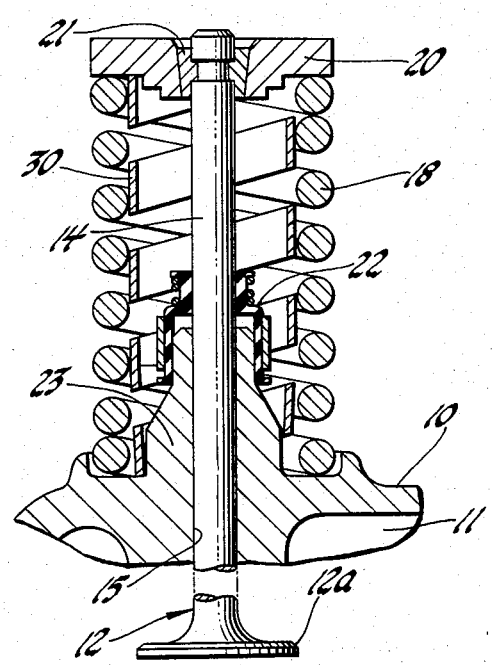
FIG. 1 is a transverse sectional view through a portion of an internal combustion engine showing a valve mechanism with a spring damper, in accordance with the invention, associated therewith.

Referring now to FIG. 1 there is shown a portion of an internal combustion engine which for purpose of illustration only is of the overhead valve type that includes a cylinder head 10 having a passage 11 therein for flow communication with a combustion cylinder, not shown, the passage 11 being either an induction passage or an exhaust passage for the cylinder.

Flow between the passage 11 and the combustion cylinder is controlled by a poppet valve 12, the valve stem 14 of which is slidably guided for axial reciprocation in a valve stem guide bore 15 provided for this purpose in the valve guide post 23 and the cylinder head 10 with the upper end of the valve stem 14 projecting above the cylinder head 10.

In a conventional manner, the valve 12 is normally maintained in a closed position, with its head 12a seated against an annular valve seat, not shown, by a round wire, straight coiled, valve return spring 18 encircling the upper portion of the stem 14 with one end, the upper end with reference to FIG. 1, of the spring engaging a conventional spring retainer 20 suitably secured to the stem of the poppet valve by a key 21 in a known manner and, its other or bottom end operatively engaging the cylinder head 10.

Opening of the valve 12 is effected in a known manner, as, for example, by a rocker arm, not shown. Also, in the construction shown, a conventional valve stem seal 22 is operatively associated with the valve stem 14 and with the integral upstanding valve guide post 23 of the cylinder head 10.

An internal type, flat wire spring damper 30, to be described in detail hereinafter and which is constructed in accordance with the subject invention, is operatively positioned concentrically within the valve return spring 18 so that one end thereof abuts against the spring retainer 20 and its bottom end operatively engages the cylinder head 10.

The term "bottom end" as used in reference to both the valve return spring 18 and the spring damper 30 refers to the non-moving end of such element, that is, the end of such element which bottoms out or abuts against a fixed element such as the cylinder head 10. Thus with reference to FIG. 1, the bottom end of both the valve return spring 18 and spring damper 30 is the lower end of these elements which remain stationary during reciprocation of the associate valve 12.

Figure 2:
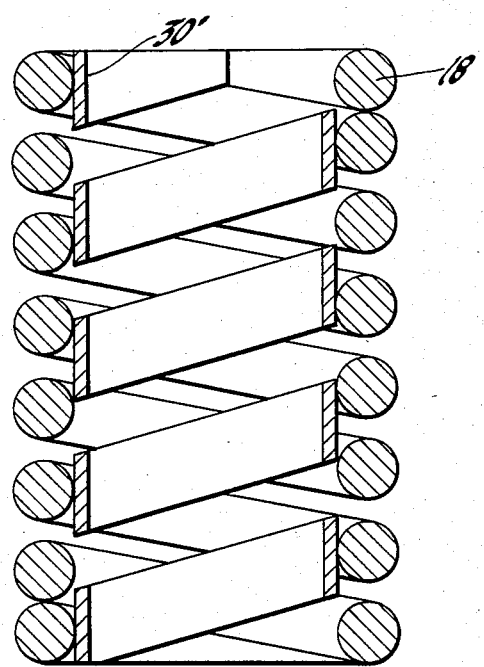
FIG. 2 is an enlarged sectional view of a conventional prior art valve return spring and spring damper, per se; and, FIG. 3 is an enlarged sectional view of a valve return spring and spring damper, per se, of FIG. 1, the spring damper being configured in accordance with the invention.

Referring now to FIG. 2, there is shown a prior art, internal type, flat ribbon wire, straight coiled, spring damper 30', made, for example, of spring steel, which is operatively associated with a valve return spring 18. As conventional, the spring damper 30' is of substantially uniform internal and external diameters across the full axial extent thereof.

As is well known in the art, the outside diameter of such an internal type, spring damper 30' is preselected relative to the effective uniform internal diameter of the coils of the valve return spring 18, whereby in the installed position of such a set of return spring and spring damper, the coils of the damper spring 30' will exert tension laterally against the insides of the coils of the valve return spring 18 so as to yieldingly resist any tendency for the valve return spring to buckle or deform laterally.

Furthermore, the frictional contact between the coils of the spring damper 30' and of the valve return spring 18 is such as to restrict movement of the coils of the valve return spring to a suitable predetermined extent, whereby during engine operation vibratory reactions are damped out and the tendency toward spring surge and the build up of vibratory periods are eliminated. This restriction, by means of the frictional contact, is of course insufficient to destroy the normal function of the valve return spring 18 to bias the associate valve toward its closed position.

Thus as shown in FIG. 2, such known prior art internal type, spring dampers are operative to frictionally engage all of the coils of an associate valve return spring. Accordingly, during engine operation such a prior art spring damper will frictionally rub against the internal diameter surfaces of the coils of the outer valve return spring causing wear thereof. As the wire coils of this outer valve return spring wears, the wear pattern can generate stress risers at the highest strain areas of the valve return spring, such as the bottom or lower 1½ coils, with reference to FIG. 2, of this spring. In addition, if the wire coils of the valve return spring have been shot peened, as is conventional in the art, this wear of the wire coils of the valve return spring negates the desired effects of such shot peening.

Figure 3:
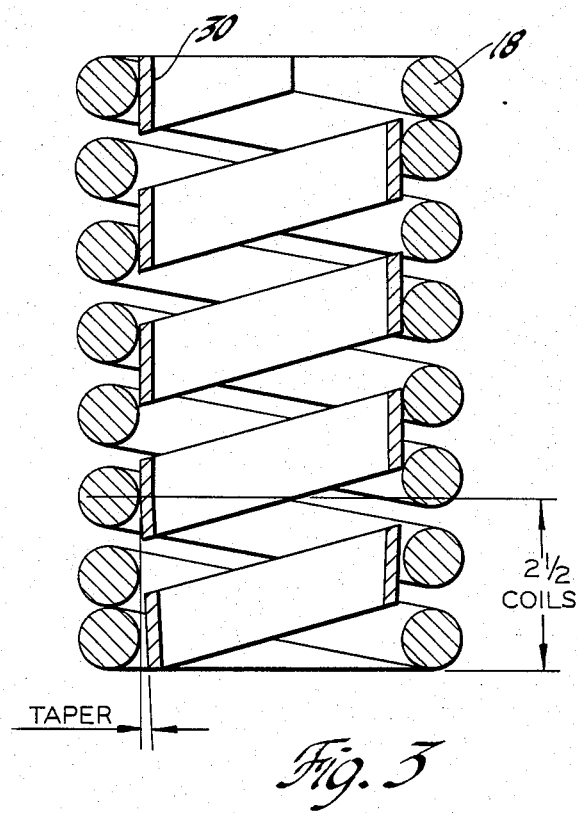

However, the spring damper 30, made in accordance with the invention as illustrated in FIGS. 1 and 3, is in effect, a relieved flat wire internal spring damper because the coils at the bottom end thereof, that is, the coils end next adjacent to the head of an associate valve, that is, the lower end with reference to FIGS. 1 and 3, are of reduced diameter relative to the external diameter of the remaining coils of the spring damper which are sized, in a conventional manner, to frictionally engage the coils of an associate valve return spring 18. With this arrangement, these bottom or lower coils of the spring damper 30, with reference to FIGS. 1 and 3, will not frictionally engage the adjacent coils of the valve return spring.

Since the highest strain areas of a valve return spring 18 occurs in approximately the last 1½ coils of the spring at the bottom end, that is, the lower or restraining end of the valve return spring 18 with reference to FIGS. 1 and 3. The relieved area or reduced external diameter area of the spring damper 30 preferably extends axially a suitable extent to prevent rubbing contact between these coils and the bottom last 1½ coils of the associate valve return spring 18, that is, the lower end 1½ coils, with reference to FIGS. 1 and 3.

The last 1½ coils at the bottom end of the valve return spring 18 are the highest stressed area of this compression spring, the area at which failure can occur.

The following theories are offered as an explanation as to why such a compression if it fails, has this failure occur in the area of 1½ total coils from the bottom end of the spring. When such a spring is loaded or unloaded, a surge wave is established which transmits torsional stress from the point of loading along the spring length to the point of restraint, that is, to the bottom of the spring. The middle coils of the spring are, of course, free to float or transfer this surge wave to the bottom end coils. The bottom end coils, being the point of restraint, receive this surge thru deflection. The intersection of each primary surge wave and reflecting surge wave combine to act as an enlarged surge at the solid bottom end coils. Finally, the mass of the spring assembly (spring retainer, key and valve) combine to act against the solid bottom end of the spring. The combination of these occurrences acting on the coils of the spring can result in any fatigue failure to occur at or approximately within 1½ total coils from the bottom end of the spring.

Accordingly, in order to prevent such contact with these 1½ coils of the valve return spring 18, at least the coils at the bottom end of the spring damper 30 are tapered radially inward starting from a distance corresponding to the axial extent of approximately 2¼ coils of the associate valve return spring 18, as best seen in FIG. 3, from the "bottom" or lower end of the spring damper 30.

As shown in FIGS. 1 and 3, the radial inward taper of the bottom or lower coils of the spring damper 30 is preselected so that the bottom coil of the spring damper has an external diameter and therefore an internal diameter whereby this bottom end coil of the spring damper encircles the lower end of the associate valve guide post 23 of the cylinder head 10 so as to be radially retained and guided thereby.

Although, in the preferred embodiment shown in FIGS. 1 and 3, only the bottom coils of the spring damper 30 are of reduced external diameter so as to be out of contact with at least the bottom 1½ coils of the valve return spring 18, it should now be apparent to those skilled in the art that the spring damper 30 can be formed with reduced external diameter coils at both ends thereof, not shown, to avoid possible misassembly of a spring damper, in accordance with the invention, with an associate valve return spring. However, it will also be apparent that such a double ended reduced external diameter spring damper will have a somewhat reduced functional effectiveness on the associate valve return spring on the end thereof opposite its bottom end.

While the invention has been described with reference to the structure disclosed herein, it is not confined to the specific details set forth, since it is apparent that various modifications and changes can be made by those skilled in the art. For example, although, in the construction shown, the valve return spring and the spring damper are illustrated as having their coils at one end in direct abutment against the cylinder head and at the other end against an associate spring retainer, it will be apparent to those skilled in the art that such end coils could be positioned to operatively abut against a conventional valve rotator, especially when such a set of spring elements are associated with an exhaust valve as is conventional in the engine art. This application is therefore intended to cover such modifications or changes as may come within the purposes of the improvements or scope of the following claims.

The embodiments of the invention in which an exclusive property or privilege is claimed are defined as follows:

1. In an internal combustion engine having a cylinder head, a poppet valve supported by the cylinder head for movement between valve open and valve closed positions, the poppet valve having a stem extending through a guide bore in the cylinder head, actuator means operatively associated with the poppet valve for reciprocating the poppet valve, the actuator means including a coiled valve return spring loosely encircling the stem of the valve and operatively associated at one end with the valve and its opposite bottom end in abutment against the cylinder head whereby to normally bias the poppet valve to the closed position and, a coiled valve spring damper of flat wire operatively positioned within the valve return spring for reducing spring coil resonance, the improvement wherein said valve spring damper is of reduced external diameter adjacent to the bottom of the valve return spring for an axial extent corresponding to approximately 2½ coils of said valve spring whereby to eliminate damper-to-spring contact up to at least 1½ coils of said valve return spring next adjacent to the bottom end thereof.

2. In an internal combustion engine having a cylinder head, a poppet valve slidably supported by the cylinder head for movement between valve open and valve closed positions, the poppet valve having a stem extending through a guide bore in the cylinder head, actuator means operatively associated with the poppet valve for reciprocating the poppet valve, the actuator means including a coiled valve return spring loosely encircling the stem of the valve and having a bottom end in operative abutment against the cylinder head and at its opposite end being operatively associated with the stem of the poppet valve for normally biasing the poppet valve to the closed position and, an internal type, coiled valve spring damper of flat wire, having a bottom end in operative abutment against the cylinder head and at its opposite end being operatively associated with the poppet valve, and being operatively positioned within the valve return spring, the improvement wherein said valve spring damper is of an operative axial extent corresponding to the operative axial extent of said valve return spring and is of reduced external diameter from adjacent said bottom end toward said opposite end of said valve return spring for an axial extent whereby to eliminate damper-to-spring contact up to at least 1½ coils of said valve return spring at the said bottom end thereof.

3. In an internal combustion engine having a cylinder head, a poppet valve slidably supported in a guide bore in the cylinder head for movement between a valve open position and a valve closed position, the poppet valve having a stem extending outward through the guide bore in the cylinder head, actuator means operatively associated with the poppet valve for reciprocating the poppet valve, the actuator means including a coiled valve return spring loosely encircling the stem of the valve and operatively associated at one end with the stem and having its bottom end operatively abutting the cylinder head for normally biasing the poppet valve to the closed position and, a coiled valve spring damper of flat wire operatively positioned within the valve return spring, the improvement wherein at least the corresponding bottom end of said valve spring damper is of reduced external diameter for an axial extent corresponding to approximately 2½ coils of said valve spring whereby to eliminate damper-to-spring contact up to approximately 1½ coils of said valve spring at its bottom end.

* * * * *